(12) United States Patent
Zhovnirovsky et al.

(10) Patent No.: US 8,109,675 B1
(45) Date of Patent: Feb. 7, 2012

(54) CONNECTOR JACK PROCESSING BACKCAP

(75) Inventors: Igor Zhovnirovsky, Newton, MA (US); Subhash Roy, Lexington, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 27 days.

(21) Appl. No.: 12/652,705

(22) Filed: Jan. 5, 2010

Related U.S. Application Data (63) Continuation-in-part of application No. 12/581,799, filed on Oct. 19, 2009, which is a continuation-in-part of application No. 12/483,616, filed on Jun. 12, 2009.

(51) Int. Cl.
G02B 6/38 (2006.01)
G02B 6/12 (2006.01)
G02B 6/26 (2006.01)
G02B 6/32 (2006.01)
G02B 6/36 (2006.01)
G02B 6/44 (2006.01)
G02B 6/00 (2006.01)

(52) U.S. Cl. ............ 385/74; 385/14; 385/31; 385/32; 385/33; 385/34; 385/70; 385/73; 385/76; 385/88; 385/92; 385/93; 385/94; 385/100; 385/139

(58) Field of Classification Search ............... 385/14, 385/31, 32, 33, 34, 70, 73, 74, 76, 88, 92, 385/93, 94, 100, 139
See application file for complete search history.

(56) References Cited

U.S. PATENT DOCUMENTS

| | | | |
|---|---|---|---|
| 2001/0048793 A1* | 12/2001 | Dair et al. ................. | 385/92 |
| 2002/0160656 A1* | 10/2002 | Nishita ..................... | 439/577 |
| 2005/0185900 A1* | 8/2005 | Farr ............................ | 385/93 |

* cited by examiner

*Primary Examiner* — Brian M. Healy
*Assistant Examiner* — Hung Lam
(74) *Attorney, Agent, or Firm* — Law Office of Gerald Maliszewski; Gerald Maliszewski (57) ABSTRACT

An optical-electrical processing jack is provided. The optical processing jack includes an optical jack with a jack housing having walls and an orifice for mechanically and optically engaging an optical plug housing. A signal bridge, with a bridge element, transceives optical signals between the optical plug and a backcap processing module. The backcap processing module includes a backcap housing with walls, attached to the jack housing and an optical element. The optical element has an optical interface to transceive an optical signal via the signal bridge, and convert optical signals and electrical signals transceived via an electrical interface. In one aspect, the bridge element is a lens with a first surface to transceive an optical signal with the optical plug, and a second surface to transceive the optical signal with the optical element optical interface. For example, the optical element is a photodiode or laser source.

33 Claims, 7 Drawing Sheets

CONNECTOR JACK PROCESSING BACKCAP

RELATED APPLICATIONS

This application is a Continuation-in-Part of a pending application entitled, OFF-AXIS MISALIGNMENT COMPENSATING FIBER OPTIC CABLE INTERFACE, invented by Igor Zhovnirovsky et al., Ser. No. 12/581,799, filed Oct. 19, 2009, which is a Continuation-in-Part of:

pending application entitled, FIBER OPTIC CABLE INTERFACE, invented by Igor Zhovnirovsky et al., Ser. No. 12/483,616, filed Jun. 12, 2009. Both these application are incorporated herein by reference.

BACKGROUND OF THE INVENTION

1. Field of the Invention

This invention generally relates to optical and electrical cables and, more particularly, to a processing module that can be attached to a cable jack.

2. Description of the Related Art

Conventionally, optical fiber connectors are spring-loaded. The fiber endfaces (optical interfaces) of the two connectors are pressed together, resulting in a direct glass to glass or plastic to plastic, contact. The avoidance of glass-to-air or plastic-to-air interfaces is critical, as an air interface results in higher connector losses. However, the tight tolerances needed to eliminate an air interface make these connectors relatively expensive to manufacture.

Figure 1:
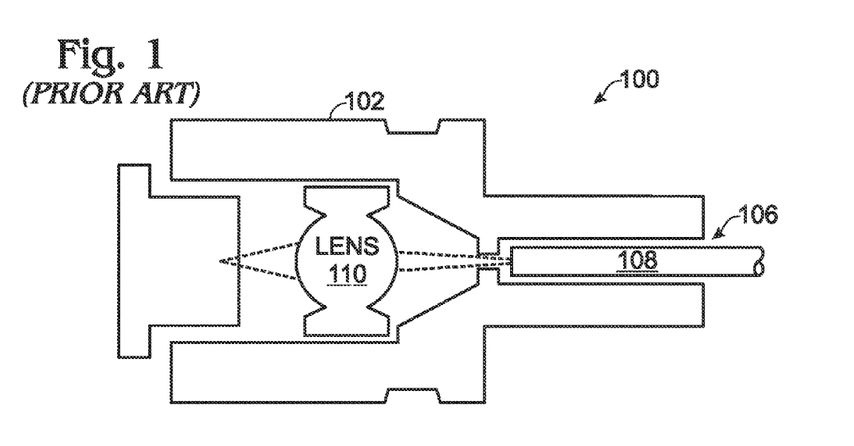
FIG. 1 is a partial cross-sectional view of a Transmission Optical SubAssembly (TOSA) optical cable plug (prior art).

FIG. 1 is a partial cross-sectional view of a Transmission Optical SubAssembly (TOSA) optical cable plug (prior art). The plug 100 is made from a plastic housing 102 with a bored ferrule 106 to secure an optical fiber 108. The plug 100 also includes a plastic lens 110, manufactured as a subassembly, integrated into the plug. The lens 110 has a curved surface to create a focal plane where the plug mates with a jack 112. The lens permits a low loss air gap to be formed between the plug and a connecting jack. In addition to the expense of manufacturing a 2-part plug, the plug must be made to relatively tight tolerances, so that the lens focal plane aligns with the jack, which also increases the cost of the plug.

Figure 2:
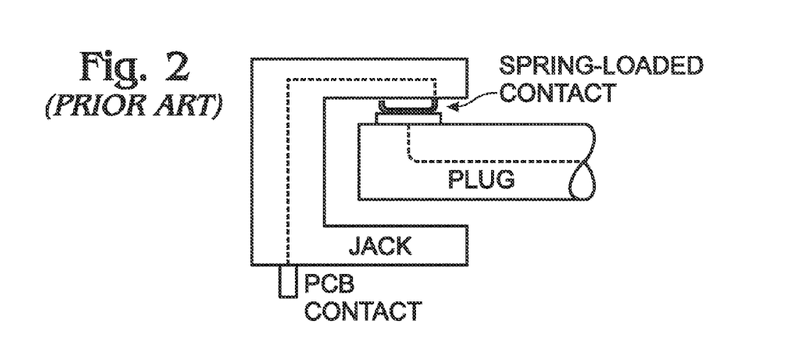
FIG. 2 is a partial cross-sectional view of an 8 Position 8 Contact (8P8C) interface (prior art).

FIG. 2 is a partial cross-sectional view of an 8 Position 8 Contact (8P8C) interface (prior art). The ubiquitous 8P8C connector is a hardwired electrical connector used commercially and residentially to connect personal computers, printers, and routers. The 8P8C is often referred to as RJ45. Although the housing/body can be made as a one-piece plastic molding, the spring-loaded contacts and the necessity of cable crimping add to the complexity of manufacturing the part. Advantageously however, the spring-loaded contacts permit the part to be made to relatively lax tolerances.

Conventionally, connectors do not include any electrical or optical signal processing capabilities. If connector interfacing circuitry requires signal preprocessing, then either an additional interface module must be interposed between the connector and the circuitry, or the printed circuit board on which the circuitry is embedded must be replaced or redesigned.

It would be advantageous if a cable connector jack, either optical or electrical, could be modified to preprocess signals transceived from a printed circuit board or interfacing cable connector plug.

SUMMARY OF THE INVENTION

A cable connector jack is provided capable of processing signals. The jack has a primary signal interface for connection to a cable plug, to send and/or received signals. The signals may be optical, electrical, or both optical and electrical. The jack is mounted on a printed circuit board (PCB) cable or has a secondary signal interface that can be connected to a PCB using a secondary connector. Between the two signal interfaces is a backcap processing module. The backcap processing module is capable of processing signals received at one interface, and passing the processed signals on to the other interface. For example, the backcap processing module is capable of converting optical signals received from a plug into electrical signal for supply to a PC board.

Accordingly, an optical-electrical processing jack is provided. The optical processing jack includes an optical jack (primary interface) with a jack housing having walls and an orifice for mechanically and optically engaging an optical plug housing. A signal bridge, with a bridge element, transceives optical signals between the optical plug and a backcap processing module. The backcap processing module includes a backcap housing with walls, attached to the jack housing and an optical element. The optical element has an optical interface to transceive an optical signal via the signal bridge, and convert optical signals and electrical signals transceived via an electrical interface. In one aspect, the bridge element is a lens with a first surface to transceive an optical signal with the optical plug, and a second surface to transceive the optical signal with the optical element optical interface. For example, the optical element is a photodiode or laser source.

A backcap electrical port (secondary interface) is connected to the optical element electrical interface. In one aspect, the backcap electrical port is a metallic pin inserted through a backcap housing wall to transceive electrical signals with the optical element electrical interface. For example, the pin may be used as a PCB connector. Alternately, the backcap electrical port includes a FLEX circuit, or some other cable or connection mechanism such as coax. A great number of connector types are known in the industry which can be interfaces to the backcap electrical port. Typically, the backcap electrical port includes reference voltage contacts, for supplying reference voltages to the backcap processing module.

Additional details of the above-described optical-electrical processing jack, a more generic signal processing jack, and associated fabrication methods are provided below.

DETAILED DESCRIPTION

Figure 3:
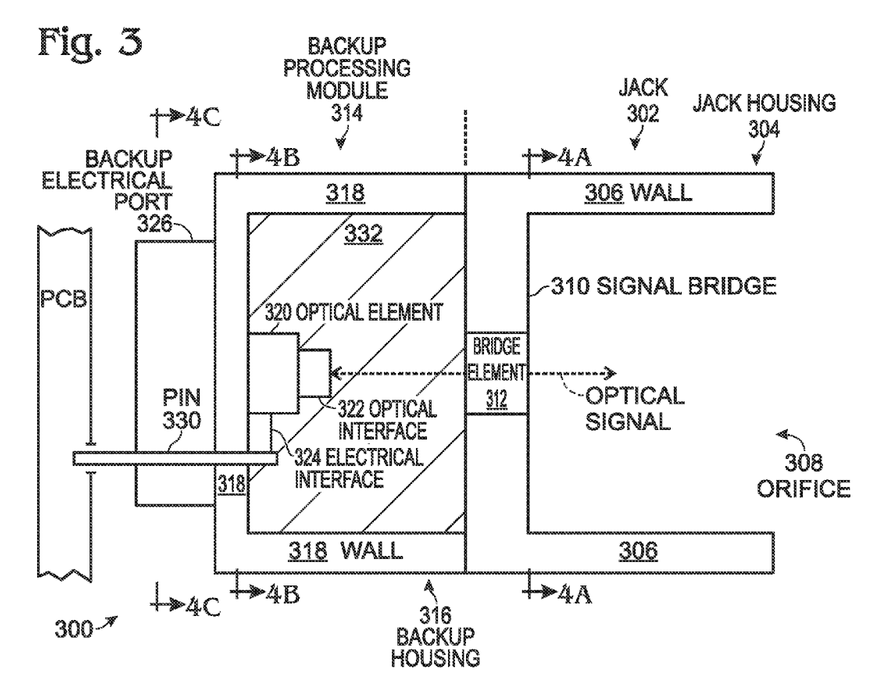
FIG. 3 is a partial cross-sectional view of an optical-electrical processing jack.

FIG. 3 is a partial cross-sectional view of an optical-electrical processing jack. The optical-electrical processing jack 300 comprises an optical jack 302 including a jack housing 304 having walls 306 and an orifice 308 for mechanically and optically engaging an optical plug housing (not shown). As used herein, a jack is the "female" portion of a mating connector, while a plug is "male" portion. Conventionally, the plug includes one or more electrical signal-carrying pins, while the jack includes orifices to receive these pins. Typically, a jack is mounted on a printed circuit board (PCB) or the housing of an electrical device. While optical signals are interfaces without the use of pins and orifices, the general terminology and naming conventions remain the same. Numerous examples of optical jack/plug interfaces are provided in pending parent applications: OFF-AXIS MIS-ALIGNMENT COMPENSATING FIBER OPTIC CABLE INTERFACE, invented by Igor Zhovnirovsky et al., Ser. No. 12/581,799, and FIBER OPTIC CABLE INTERFACE, invented by Igor Zhovnirovsky et al., Ser. No. 12/483,616, which are incorporated herein by reference.

A signal bridge 310 includes a bridge element 312 for transceiving an optical signal between the optical plug and a backcap processing module 314. A signal bridge, as associated with FIG. 3, is a module for transceiving optical signals between the optical jack 302 and the backcap processing module 314. A bridge element 312 is a component of the signal bridge that transceives a particular optical signal. That is, there is a bridge element for each optical signal. The backcap processing module 314 includes a backcap housing 316 with walls 318, attached to the jack housing 304. An optical element 320 has an optical interface 322 to transceive an optical signal via the signal bridge 310. The optical element 320 converts optical signals and electrical signals transceived via an electrical interface 324. In one aspect as shown, the electrical interface 324 is a wire bond. Alternately but not shown, the optical element and pin can be mounted on a PCB, and the pin 330 is connected to the optical element via a trace on the board. Typically, the optical element 320 is either a laser source, to create an optical signal in response to an electrical trigger, or a photodiode to convert an optical signal into an electrical signal. Some examples of laser sources include laser diodes and vertical-cavity surface-emitting lasers (VCSELs).

A backcap electrical port 326 is connected to the optical element electrical interface 324 on line 326. In one aspect as shown, the backcap electrical port 326 includes a metallic pin 330 inserted through a backcap housing wall 318 to transceive electrical signals with the optical element electrical interface 324. In one aspect, the backcap electrical port 326 is a PCB contact mounted on a backcap housing wall exterior surface. Thus, the pin 330 may be directly soldered to a PC board (as shown). Alternately, the pin 330 may interface to an electrical connector (not shown).

In one aspect, the bridge element 312 is a lens with a first surface to transceive an optical signal with the optical plug, and a second surface to transceive the optical signal with the optical element optical interface 322. See FIGS. 7A and 7B for additional details of the lens bridge element. Alternately, the bridge element can be a hole in the jack housing and backcap housing walls, a section of fiber optic cable, or a combination photodiode and laser source to relay optical signals between the plug and backcap processing module optical element.

Figure 4A:
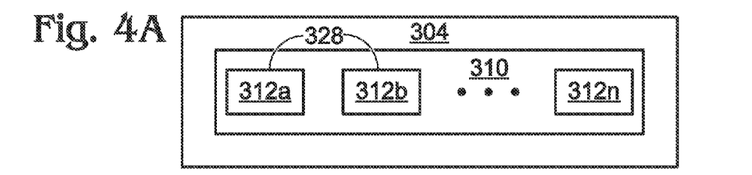
FIGS. 4A through 4C are cross-sectional views of the optical-electrical processing jack of FIG. 3, from an orthogonal perspective.

FIGS. 4A through 4C are cross-sectional views of the optical-electrical processing jack of FIG. 3, from an orthogonal perspective. As shown in FIG. 4A, the signal bridge 310 may include a first plurality of bridge elements 312a through 312n, where n is a variable not limited to any particular value, where each bridge element has a first surface 328 to transceive an optical signal with the optical plug, and a second surface (not shown) on the opposite side of the first surface 328. For example, there may be n bridge elements 312. In one aspect, some of the bridge elements transceive electrical signals, while other bridge elements transceive optical signals.

Figure 4B:
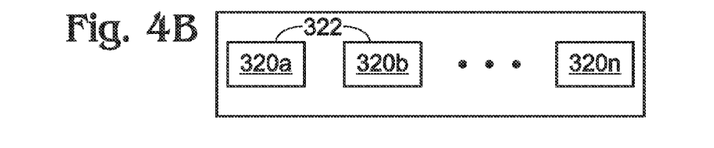

As shown in FIG. 4B, the backcap processing module 314 includes a first plurality of optical elements 320a through 320n, where n is a variable not limited to any particular value. Each optical element 320 transceives optical signals with a corresponding bridge element second surface (not shown). To continue the example, there may be n optical elements 320. In one aspect, some of the elements 320 may be electrical signal elements for transceiving electrical signals with the signal bridge 310.

Figure 4C:
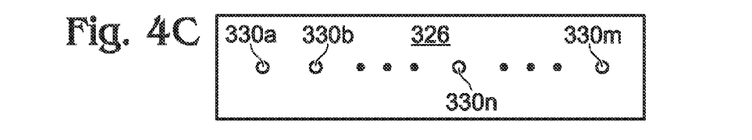

As shown in FIG. 4C, the backcap electrical port 326 may include a first plurality of contacts 330, where each contact transceives electrical signals with a corresponding optical element (see FIG. 4B). To continue the example, there may be m contacts 330a through 310m, where m is a variable not limited to any particular value, n of which are connected to optical (or electrical signal) elements. Typically, the backcap electrical port 326 has reference voltage contacts, for supplying reference voltages to the backcap processing module. Thus, (m-n) of the contacts shown carry a voltage potential or ground.

It should also be noted that the number of electrical signal contacts need not necessarily match the number of optical elements or optical fibers in the mating optical plug. In one aspect, the backcap processing module converts between a plurality of lower speed electrical signals transceived via the backcap electrical port and a higher speed optical signal transceived via the optical jack. For example, the backcap processing module may include a serializer/deserializer (SERDES) device, there may be more contacts in one connector (e.g., the backcap electrical port) than the other connector (e.g., the optical jack).

Figure 5:
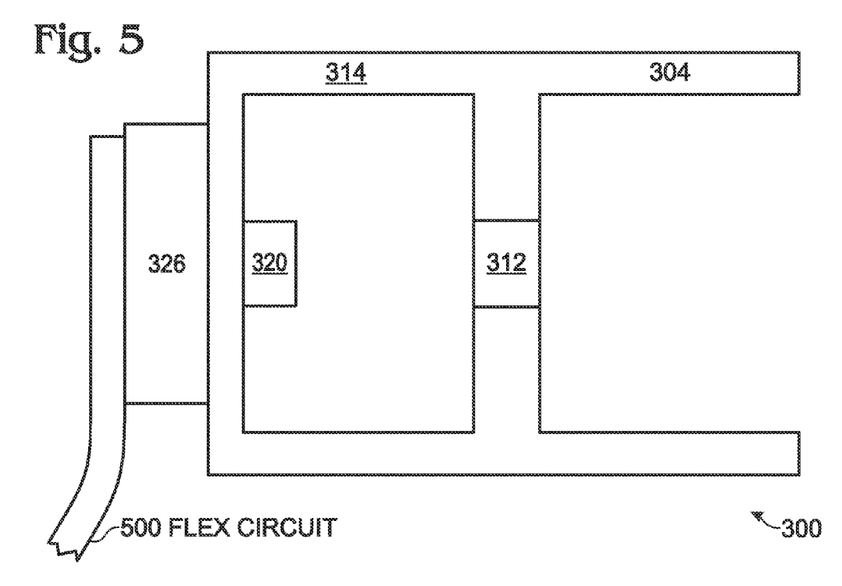
FIG. 5 is a partial cross-sectional view depicting a first variation of the optical-electrical processing jack of FIG. 3.

FIG. 5 is a partial cross-sectional view depicting a first variation of the optical-electrical processing jack of FIG. 3. In this aspect, the backcap electrical port 326 includes a FLEX circuit 500. Alternately but not shown, the backcap electrical port may include an alternate type of cable or an electrical connector jack. In one aspect, the FLEX circuit has an electrical plug interface (not shown) for connection to a PCB. Returning to FIG. 3, in one aspect, the backcap processing module 314 includes a transparent material-filled cavity 332, represented as hatched lines, formed between the optical element optical interface 322 and the signal bridge 310. As used herein, the term "transparent" means that material has a relatively low loss in the range of wavelengths in which the optical elements operate. Silicon resin and glycerin are examples of some materials that might be used as the "transparent" material. Resins can cure hard or into a gelatinous state. In one aspect, the cavity is filled through a hole in a backcap housing wall, with a transparent material in a liquid phase, which is then allowed to set into a solid phase. In another aspect, the transparent material is introduced as a liquid, and it remains in liquid phase. Glycerin is an example of a liquid that can be injected. We could also inject an inert gas. In another aspect, an inert gas, such as argon, could be injected. Typically, the transparent material is chosen to optimize the transmission characteristics between the bridge element and the optic semiconductors to keep the beam from spreading, minimize optical power loss, and minimize interference with other proximate transmitters and receivers. A secondary function is to mechanically secure parts in the backcap housing.

Figure 6:
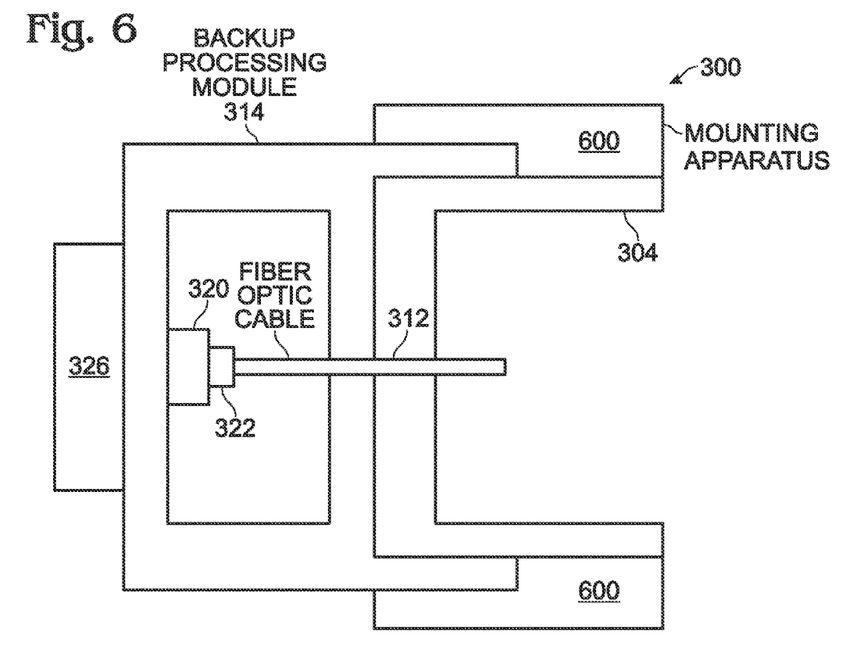
FIG. 6 is a partial cross-sectional view depicting a second variation of the optical-electrical processing jack of FIG. 3.

FIG. 6 is a partial cross-sectional view depicting a second variation of the optical-electrical processing jack of FIG. 3. In one aspect as shown in FIG. 3, the backcap processing module is fixed to the jack housing. Alternately as shown, the jack housing 304 includes a selectively detachable mounting apparatus 600, and the backcap processing module 314 is attached to the jack housing 304 via the mounting apparatus 600. CLAIM 9 Advantageously, the mounting apparatus permits the backcap processing module to be disconnected from the jack housing, permitting the option of repairing a backcap processing module or the use of different backcap processing module types. Numerous selectively engagable mounting apparatus are known in the art. Note: in this aspect the bridge element 312 is shown as a fiber optic cable.

Figure 7A:
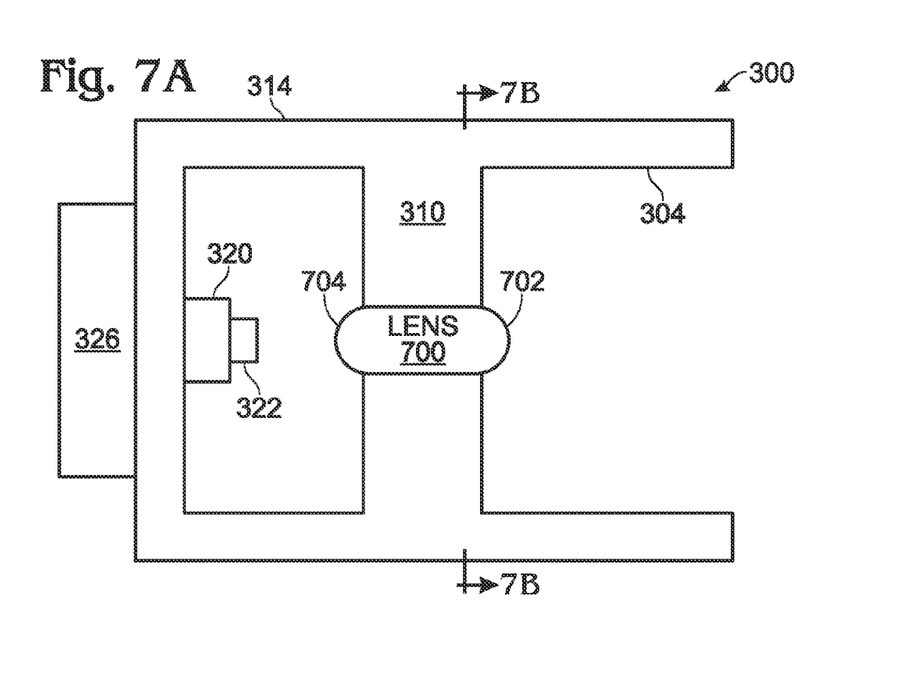
FIGS. 7A and 7B are partial cross-sectional views depicting a third variation of the optical-electrical processing jack of FIG. 3.

FIGS. 7A and 7B are partial cross-sectional views depicting a third variation of the optical-electrical processing jack of FIG. 3. As shown in FIG. 7A, the signal bridge and bridge element of FIG. 3 comprises at least one lens 700 mounted in a jack housing wall 306. The lens 700 has a first surface 702 to transceive an optical signal with the optical plug, and a second surface 704 to transceive the optical signal through the jack housing 304. Typically, the lens surface may be convex or plano in shape. The processing jack is not limited to any particular style of lens, lens surface, material, transmittance, refractive index, or color.

Figure 7B:
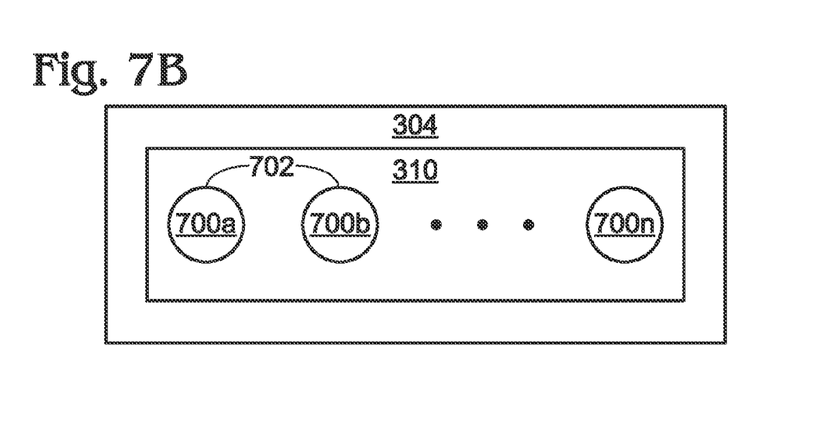

As shown in FIG. 7B, optical jack 302 may include a first plurality of lenses. Lenses 700a through 700n are shown, each lens 700 having a first surface 702 to transceive an optical signal with the optical plug, and a second surface (see FIG. 7A). Likewise, the backcap processing module includes a first plurality of optical elements 320, where each optical element is optically connected to a corresponding lens, see FIG. 4B. Likewise, the backcap electrical port includes a first plurality of contacts, where each contact transceives electrical signals with a corresponding optical element, see FIG. 4C.

Figure 8:
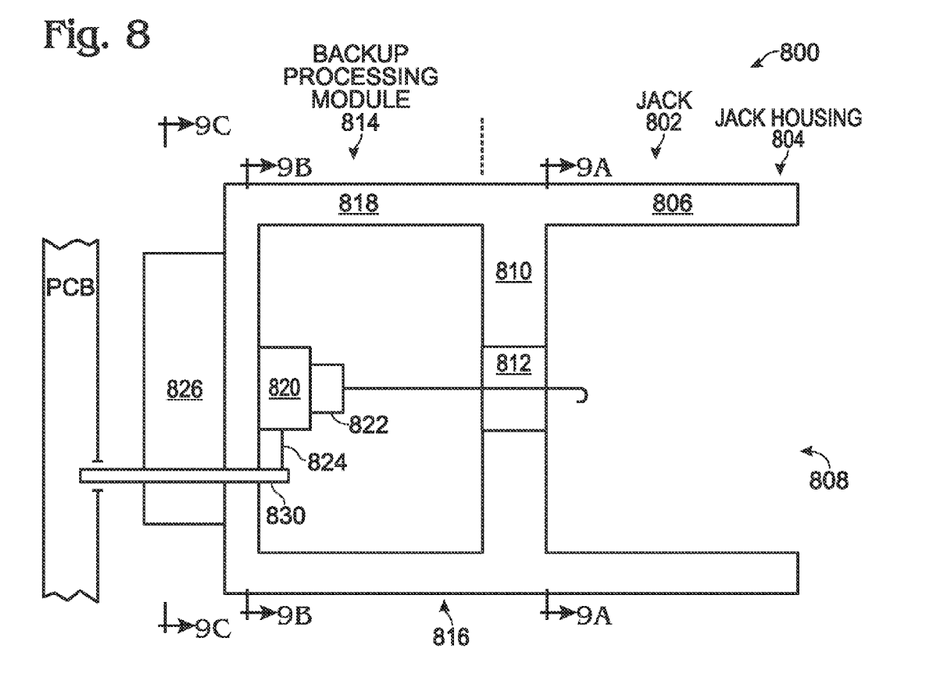
FIG. 8 is a partial cross-sectional view of a connector jack with backcap processing module.

FIG. 8 is a partial cross-sectional view of a connector jack with backcap processing module. Unlike the optical-electrical jack devices of FIGS. 3 through 7B, processing jack 800 may be used to transceive only electrical signals. The processing jack 800 comprises a connector jack 802 having a jack housing 804 with walls 806 and an orifice 808 for mechanically engaging a connector plug housing (not shown). For example, the connector jack 802 may be an 8P8C jack. A signal bridge 810 has a bridge element 812 to transceive signals between the plug and a backcap processing module 814. For example, the bridge element 812 may be a metal pin, wire, or metal contact (as shown) to transceive an electrical first signal between the electrical plug and the signal element first interface.

The backcap processing module 814 includes a backcap housing 816 with walls 818, attached to the signal bridge 810. A signal element 820 has a first signal interface 822 to transceive a first signal via the bridge element 812, and convert between the first signal and a second signal transceived via a second interface on line 824. A backcap electrical port 826 on an exterior surface of a backcap wall 818 has a contact 830 connected to the signal element second interface on line 824. The contact 830 may be connected to the second signal interface, for example, via a wire or via a trace on a PCB.

In one aspect, the jack 802 is an optical jack, and the signal bridge may transceive an optical signal to an optical signal element 820, see FIGS. 3 through 7B. In that aspect, the signal element converts between an optical first signal and an electrical second signal. In another aspect, the signal element is electrical. For example, the signal element be an amplifier that converts the first electrical signal to a second electrical signal with a different voltage or current gain.

In one aspect as shown, the backcap electrical port 826 includes a metallic pin 830 inserted through a backcap housing wall 818 to transceive electrical signals with the signal element second interface 824. In one aspect, the backcap electrical port 826 is a PCB contact mounted on a backcap housing wall exterior surface. Thus, the pin 830 may be directly soldered to a PC board (as shown). Alternately, the pin 830 may interface to an electrical connector (not shown).

Figure 9A:
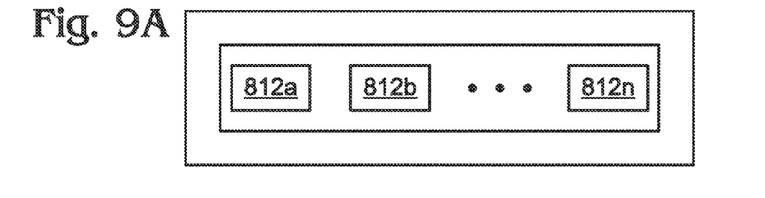
FIGS. 9A through 9C are cross-sectional views of the processing jack of FIG. 8, from an orthogonal perspective.

FIGS. 9A through 9C are cross-sectional views of the processing jack of FIG. 8, from an orthogonal perspective. As shown in FIG. 9A, the signal bridge 810 may include a first plurality of bridge elements 812, where each bridge element 812 transceives an electrical signal with the connector plug 802. For example, there may be n bridge elements 812.

Figure 9B:
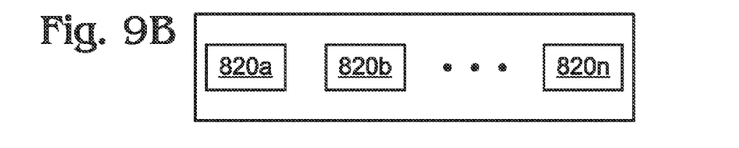
Figure 9C:
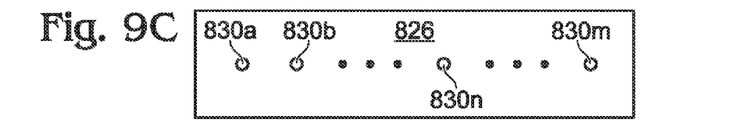

As shown in FIG. 9B, the backcap processing module 814 includes a first plurality of signal elements 820. Each signal element 820 transceives signals with a corresponding bridge element (not shown). To continue the example, there may be n signal elements 820. As shown in FIG. 9C, the backcap electrical port 826 may include a first plurality of contacts 830, where each contact transceives electrical signals with a corresponding signal element (see FIG. 9B). To continue the example, there may be m contacts 830, with connections to n signal elements. Typically, the backcap electrical port 326 has reference voltage contacts, for supplying reference voltages to the backcap processing module. Thus, (m-n) of the contacts shown carry a voltage potential or ground.

It should also be noted that the number of electrical signal contacts need not necessary match the number of bridge elements or signal wires in the mating plug. In one aspect, a signal element, e.g., signal element 820a, has a first plurality of second interfaces, for converting between a first signal at a first rate and a first plurality of second signals having a combined rate about equal to the first rate. For example, signal element 820a may transceive electrical signals on pins 830a and 830b. In another aspect, the first plurality of second interfaces may transceive signals at a plurality of different rates.

Figure 10:
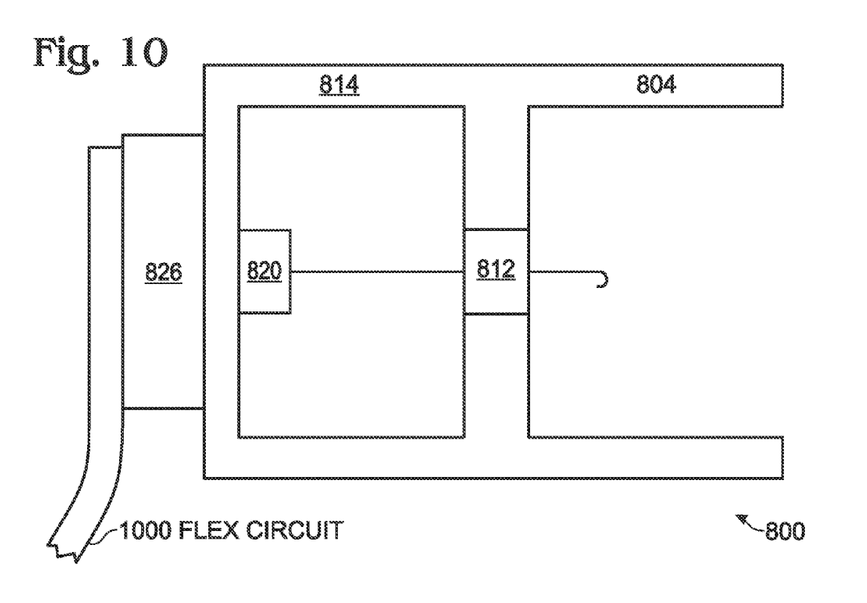
FIG. 10 is a partial cross-sectional view depicting a first variation of the processing jack of FIG. 8.

FIG. 10 is a partial cross-sectional view depicting a first variation of the processing jack of FIG. 8. In this aspect, the backcap electrical port 826 includes a FLEX circuit 1000. Alternately but not shown, the backcap electrical port may include an alternate type of cable or an electrical connector jack.

Figure 11:
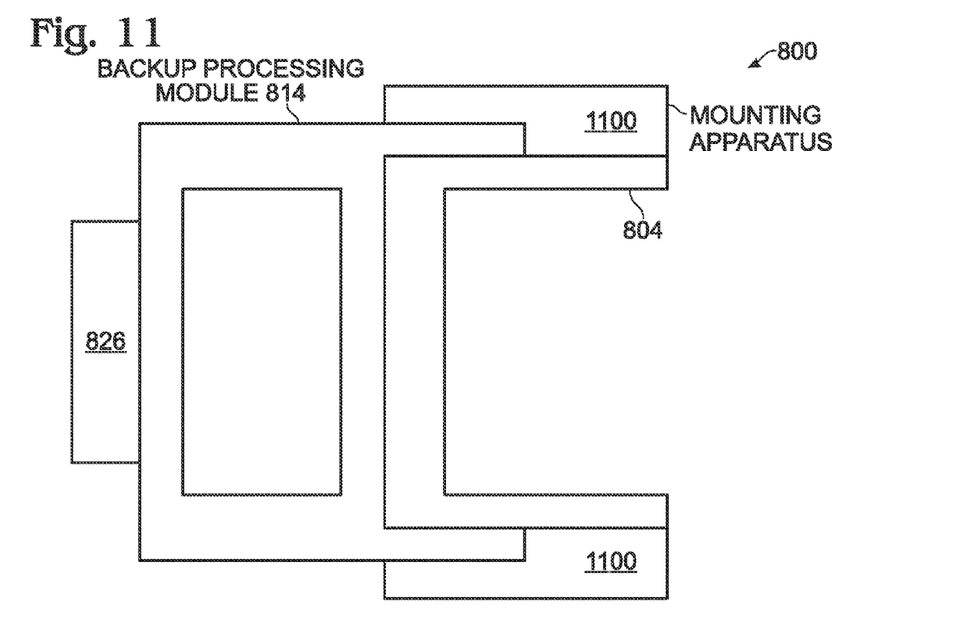
FIG. 11 is a partial cross-sectional view depicting a second variation of the optical-electrical processing jack of FIG. 8.

FIG. 11 is a partial cross-sectional view depicting a second variation of the optical-electrical processing jack of FIG. 8. In one aspect as shown in FIG. 8, the backcap processing module is fixed to the jack housing. Alternately as shown, the jack housing 804 includes a selectively detachable mounting apparatus 1100, and the backcap processing module 814 is attached to the jack housing 804 via the mounting apparatus 1100. Advantageously, the mounting apparatus permits the backcap processing module to be disconnected from the jack housing, permitting the option of repairing a backcap processing module or the use of different backcap processing module types. Numerous selectively engagable mounting apparatus are known in the art.

The mechanical housing mentioned above in FIGS. 3 through 11 may have the form factor of an 8 Position 8 Contact (8P8C) plug mechanical body. This is not to say that the optical cable in this form need necessarily be mated to a conventional 8P8C electrical jack, but rather, that the mechanical housing can be interfaced with the next generation optical cable that will be replacing the 8P8C electrical cable. However in one aspect, the mechanical bodies can be interfaced with an 8P8C form factor jack that incorporates the electrical contacts of a convention 8P8C connector, but also includes at least one optical interface. It should be noted, however, that the fiber optic cable is not limited to any particular jack form factor.

Figure 12:
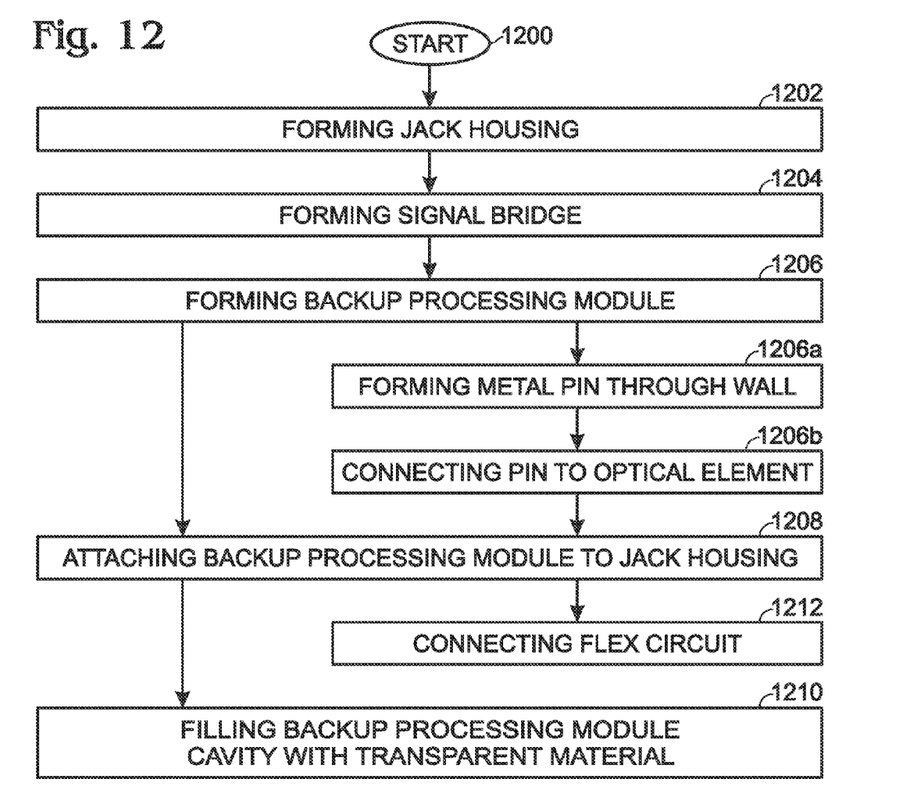
FIG. 12 is a flowchart illustrating a method for fabricating an optical-electrical processing jack.

FIG. 12 is a flowchart illustrating a method for fabricating an optical-electrical processing jack. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps follow in numerical order. The method starts at Step 1200.

Step 1202 forms an optical jack housing having walls and an orifice for mechanically engaging an optical plug housing, see FIG. 3. Step 1204 forms a signal bridge with a bridge element for transceiving the optical signal. Step 1206 forms a backcap processing module with walls. The backcap processing module includes an optical element for converting between optical signals transceived via an optical element optical interface and electrical signals transceived via an optical element electrical interface. The backcap processing module also includes a backcap electrical port on an exterior surface of a backcap processing module wall, connected to the optical element electrical interface. Step 1208 attaches the backcap processing module to the jack housing. For example, Step 1208 may form a printed circuit board (PCB) contact. In another variation, Step 1212 connects a FLEX circuit, or some other type of connections means, to the metal pin.

In one aspect, forming the backcap processing module in Step 1206 includes substeps. Step 1206*a* forms a metal pin through the backcap wall. Step 1206*b* connects the pin to the optical element electrical interface. For example, Step 1206*b* may wire bond the optical element electrical interface to the pin.

In another aspect, forming the backcap processing module in Step 1206 includes forming a backcap cavity bounded by a bottom surface wall and four sides. Then, subsequent to attaching the backcap processing module to the jack housing in Step 1208, Step 1210 fills the backcap cavity with a transparent material.

Processing jacks have been provided for processing both electrical and optical-electrical signal conversions. Some examples of particular designs and arrangements have been given to illustrate the invention. However, the invention is not limited to merely these examples. Other variations and embodiments of the invention will occur to those skilled in the art.

We claim:

1. An optical-electrical processing jack comprising:
   an optical jack including:
      a jack housing having walls and an orifice;
      a connector mechanical interface formed in the jack housing walls, capable of selectively engaging a plug connector mechanical interface without permanently fixing the jack connector mechanical interface to the plug connector mechanical interface;
      a signal bridge formed in a jack housing wall with a bridge element for transceiving an optical signal between a connected plug connector optical interface lens and a backcap processing module;
      a connector optical interface forming an air gap cavity between the bridge element and the connected plug connector optical interface lens, the air gap cavity having a variable range of lengths when the jack connector mechanical interface is engaged with the plug connector mechanical interface;
   a backcap processing module including:
      a backcap housing with walls, attached to the jack housing;
      an optical element having an optical interface to transceive an optical signal via the signal bridge, the optical element converting optical signals and electrical signals transceived via an electrical interface; and,
      a backcap electrical port connected to the optical element electrical interface.

2. The jack of claim 1 wherein the bridge element is a lens with a first surface to transceive an optical signal with the connected plug connector optical interface lens, and a second surface to transceive the optical signal with the optical element optical interface.

3. The jack of claim 1 wherein the signal bridge includes a first plurality of lens bridge elements, each bridge element having a first surface to transceive an optical signal with a corresponding connected plug connector optical interface lens, and a second surface;
   wherein the backcap processing module includes a first plurality of optical elements, each optical element transceiving optical signals with a corresponding lens second surface, and the backcap electrical port includes a first plurality of contacts, each contact transceiving electrical signals with a corresponding optical element.

4. The jack of claim 1 wherein the backcap electrical port includes a metallic pin inserted through a backcap housing wall to transceive electrical signals with the optical element electrical interface.

5. The jack of claim 4 wherein the backcap electrical port includes a FLEX circuit.

6. The jack of claim 1 wherein the backcap processing module includes a transparent material-filled cavity formed between the optical element optical interface and the signal bridge.

7. The jack of claim 1 wherein the backcap electrical port has reference voltage contacts, for supplying reference voltages to the backcap processing module.

8. The jack of claim 1 where in the optical element is selected from a group consisting of a laser source and a photodiode.

9. The jack of claim 1 wherein the jack housing includes a selectively detachable mounting apparatus; and,
   wherein the backcap processing module is attached to the jack housing via the mounting apparatus.

10. The jack of claim 1 wherein the backcap electrical port is a printed circuit board (PCB) contact mounted on a backcap housing wall exterior surface.

11. A method for fabricating an optical-electrical processing jack, the method comprising:
   forming an optical jack housing having walls and an orifice;
   forming a connector mechanical interface in the jack housing walls, capable of selectively engaging a plug connector mechanical interface without permanently fixing the jack connector mechanical interface to the plug connector mechanical interface;

forming a signal bridge in a wall of the jack housing with a bridge element for transceiving an optical signal between a connected plug connector optical interface lens and a backcap processing module;

forming a connector optical interface with an air gap cavity between the bridge element and the connected plug connector optical interface lens, the air gap cavity having a variable range of lengths when the jack connector mechanical interface is engaged with the plug connector mechanical interface;

forming a backcap processing module with walls, the backcap processing module including an optical element for converting between optical signals transceived via an optical element optical interface and electrical signals transceived via an optical element electrical interface;

forming a backcap electrical port on an exterior surface of a backcap processing module wall, connected to the optical element electrical interface; and, attaching the backcap processing module to the jack housing.

12. The method of claim 11 wherein forming the backcap processing module includes:
forming a metal pin through the backcap wall; and,
connecting the pin to the optical element electrical interface.

13. The method of claim 12 wherein connecting the pin to the optical element electrical interface includes wire bonding the optical element electrical interface to the pin.

14. The method of claim 11 wherein forming the backcap processing module includes forming a backcap cavity bounded by a bottom surface wall and four sides; and,
the method further comprising:
subsequent to attaching the backcap processing module to the jack housing, filling the backcap cavity with a transparent material.

15. The method of claim 12 further comprising:
connecting a FLEX circuit to the metal pin.

16. The method of claim 11 wherein forming the backcap electrical port includes forming a printed circuit board (PCB) contact.

17. An optical-electrical conversion jack comprising:
an optical jack including:
a jack housing with walls;
a connector mechanical interface formed in the jack housing walls, capable of selectively engaging a plug connector mechanical interface without permanently fixing the jack connector mechanical interface to the plug connector mechanical interface;
at least one lens mounted in a jack housing wall, the lens having a first surface to transceive an optical signal with a connected plug connector optical interface lens, and a second surface to transceive the optical signal through a wall of the jack housing;
a connector optical interface forming an air gap cavity between the jack lens first surface and the connected plug connector optical interface lens, the air gap cavity having a variable range of lengths when the jack connector mechanical interface is engaged with the plug connector mechanical interface;
a backcap processing module including:
a backcap housing with walls, attached to an exterior surface of the jack housing wall;
an optical element having an optical interface optically connected to the lens second surface, the optical element converting between optical signals and electrical signals transceived via an electrical interface; and,
a backcap electrical port on an exterior surface of a backcap wall, electrically connected to the optical element electrical interface.

18. The jack of claim 17 wherein the optical jack includes a first plurality of lenses, each lens having a first surface to transceive an optical signal with a corresponding connected plug connector optical interface lens, and a second surface;
wherein the backcap processing module includes a first plurality of optical elements, each optical element optically connected to a corresponding lens, and the backcap electrical port includes a first plurality of contacts, each contact transceiving electrical signals with corresponding optical element.

19. The jack of claim 17 wherein the backcap electrical port includes a metallic pin inserted through a backcap wall to transceive electrical signals with the optical element electrical interface.

20. The jack of claim 9 wherein the backcap electrical port includes a FLEX circuit.

21. The jack of claim 17 wherein the backcap processing module includes a transparent material-filled cavity formed between the optical element optical interface and the lens second surface.

22. The jack of claim 17 wherein the backcap electrical port has reference voltage contacts for supplying reference voltages to the backcap processing module.

23. The jack of claim 17 where in the optical element is selected from a group consisting of a laser source and a photodiode.

24. The jack of claim 17 wherein the jack housing wall includes a selectively detachable mounting apparatus; and,
wherein the backcap processing module is attached to the jack housing via the mounting apparatus.

25. A connector jack with backcap processing module, the processing jack comprising:
a connector jack including:
a jack housing having walls and an orifice;
a connector mechanical interface formed in the jack housing walls, capable of selectively engaging a plug connector mechanical interface without permanently fixing the jack connector mechanical interface to the plug connector mechanical interface;
a signal bridge with a bridge element formed in a wall of the jack housing to transceive signals between a connected plug connector optical interface lens and a backcap processing module;
a connector optical interface forming an air gap cavity between the bridge element and the connected plug connector optical interface lens, the air gap cavity having a variable range of lengths when the jack connector mechanical interface is engaged with the plug connector mechanical interface;
a backcap processing module including:
a backcap housing with walls, attached to the signal bridge;
a signal element having a first signal interface to transceive a first signal via the bridge element, and convert between the first signal and a second signal transceived via a second interface; and,
a backcap electrical port on an exterior surface of a backcap wall, with a contact connected to the signal element second interface.

26. The processing jack of claim 25 wherein the signal bridge includes a first plurality of bridge elements, each bridge element transceiving a signal with a corresponding connected plug connector optical interface lens;

wherein the backcap module includes a first plurality of signal elements, each signal element transceiving signals with a corresponding bridge element, and the backcap electrical port includes a first plurality of contacts, each contact transceiving electrical signals with a corresponding signal element.

27. The processing jack of claim 25 wherein the backcap electrical port includes a metallic pin inserted through the backcap wall to transceive electrical signals with the signal element second interface.

28. The processing jack of claim 27 wherein the backcap electrical port includes a FLEX circuit.

29. The processing jack of claim 25 wherein the jack housing includes a selectively detachable mounting apparatus; and, wherein the backcap processing module is attached to the signal bridge via the mounting apparatus.

30. The processing jack of claim 25 wherein the signal element converts between an optical first signal and an electrical second signal.

31. The processing jack of claim 30 wherein the bridge element is a lens with a first surface to transceive an optical first signal with an optical plug, and a second surface to transceive the optical signal with the signal element first interface.

32. The processing jack of claim 25 wherein the signal element has a first plurality of second interfaces, for converting between a first signal at a first rate and a first plurality of second signals having a combined rate about equal to the first rate.

33. The processing jack of claim 32 wherein the bridge element is a metal contact to transceive an electrical first signal between an electrical plug and the signal element first interface.

* * * * *